(12) United States Patent
Zhao et al.

(10) Patent No.: US 6,764,020 B1
(45) Date of Patent: Jul. 20, 2004

(54) THERMOSTAT APPARATUS FOR USE WITH TEMPERATURE CONTROL SYSTEM

(75) Inventors: Ken Zhao, West Roxbury, MA (US); Matthew Fratantonio, Northborough, MA (US); Wayne R. Duprez, Waltham, MA (US)

(73) Assignee: Standard-Thomson Corporation, Waltham, MA (US)

( * ) Notice: Subject to any disclaimer, the term of this patent is extended or adjusted under 35 U.S.C. 154(b) by 0 days.

(21) Appl. No.: 10/376,829

(22) Filed: Feb. 28, 2003

(51) Int. Cl.⁷ .......................... G05D 15/00; G05D 23/00

(52) U.S. Cl. .................... 236/68 R; 236/99 K; 60/528; 251/11; 123/41.1

(58) Field of Search .............................. 236/68 R, 72, 236/91 R, 91 D, 99 K; 60/528, 516, 517, 520, 523; 251/11; 318/117; 123/41.1

(56) References Cited

U.S. PATENT DOCUMENTS

| | | |
|---|---|---|
| 4,225,841 A | 9/1980 | Saur et al. |
| 4,306,210 A | 12/1981 | Saur |
| 4,389,629 A | 6/1983 | Saur et al. |
| 4,522,334 A | 6/1985 | Saur |
| 4,537,158 A | 8/1985 | Saur |
| 4,550,693 A | 11/1985 | Saur |
| 4,642,599 A | 2/1987 | Saur |
| 4,674,679 A | 6/1987 | Saur |
| 4,911,358 A | 3/1990 | Mehta |
| 4,944,160 A | 7/1990 | Malone et al. |
| 4,948,044 A | 8/1990 | Cacciatore |
| 4,955,431 A | 9/1990 | Saur et al. |
| 4,983,813 A | 1/1991 | Van Tulleken et al. |
| 4,993,231 A | 2/1991 | Torrence et al. |
| 5,038,851 A | 8/1991 | Mehta |
| 5,065,813 A | 11/1991 | Berkeley et al. |
| 5,095,940 A | 3/1992 | Saur et al. |
| 5,107,918 A | 4/1992 | McFarlane et al. |
| 5,161,606 A | 11/1992 | Berkeley et al. |
| 5,183,012 A | 2/1993 | Saur et al. |
| 5,195,467 A | 3/1993 | Kurz |
| 5,199,637 A | 4/1993 | Adams |
| 5,211,332 A | 5/1993 | Adams |
| 5,230,482 A | 7/1993 | Ratz et al. |
| 5,231,955 A | 8/1993 | Saur et al. |
| 5,238,185 A | 8/1993 | Saur et al. |
| 5,292,064 A | 3/1994 | Saur et al. |
| 5,294,047 A | 3/1994 | Schwer et al. |
| 5,304,781 A | 4/1994 | Stalsberg |
| 5,329,991 A | 7/1994 | Mehta et al. |
| 5,331,996 A | 7/1994 | Ziehm |
| 5,385,296 A | 1/1995 | Kurz et al. |
| 5,419,488 A | 5/1995 | Saur et al. |
| 5,467,921 A | 11/1995 | Shreeve et al. |
| 5,482,209 A | 1/1996 | Cochran et al. |
| 5,494,005 A | 2/1996 | Saur |
| 5,520,327 A | 5/1996 | Shreeve et al. |
| 5,528,017 A | 6/1996 | Wolff |
| 5,582,138 A | 12/1996 | Ziolek et al. |
| 5,592,989 A | 1/1997 | Lynn et al. |
| 5,607,324 A | 3/1997 | Saur et al. |
| 5,611,484 A | 3/1997 | Uhrich |
| 5,617,816 A | 4/1997 | Saur et al. |
| 5,634,590 A | 6/1997 | Gorski et al. |
| 5,676,308 A | 10/1997 | Saur |
| 5,678,300 A | 10/1997 | Saur et al. |
| 5,711,258 A | 1/1998 | Saur |
| 5,738,276 A | 4/1998 | Saur |

(List continued on next page.)

OTHER PUBLICATIONS

Drawings of Thermostat (2 pages) (May 5, 1982).

*Primary Examiner*—Marc Norman
(74) *Attorney, Agent, or Firm*—Barnes & Thornburg (57) ABSTRACT

A thermostat apparatus is provided. The thermostat apparatus comprises a thermostat and a positioner for establishing different operating temperatures for thermostat.

20 Claims, 5 Drawing Sheets

U.S. PATENT DOCUMENTS

| | | | | |
|---|---|---|---|---|
| 5,755,283 A | * | 5/1998 | Yates et al. | 165/297 |
| 5,775,270 A | | 7/1998 | Huemer et al. | |
| 5,782,296 A | | 7/1998 | Mehta | |
| 5,799,625 A | * | 9/1998 | Ziolek et al. | 123/41.1 |
| 5,866,882 A | | 2/1999 | Saur et al. | |
| 5,873,519 A | | 2/1999 | Beilfuss | |
| 5,883,365 A | | 3/1999 | Saur et al. | |
| 5,897,055 A | | 4/1999 | Saur et al. | |
| 5,937,942 A | | 8/1999 | Bias et al. | |
| 5,971,288 A | * | 10/1999 | Davis et al. | 236/68 R |
| 5,979,778 A | | 11/1999 | Saur | |
| 5,996,619 A | | 12/1999 | Saur et al. | |
| 6,006,996 A | | 12/1999 | Bhatnagar | |
| 6,062,483 A | | 5/2000 | Meletio | |
| 6,101,987 A | | 8/2000 | Saur et al. | |
| 6,102,749 A | | 8/2000 | Lynn et al. | |
| 6,196,467 B1 | | 3/2001 | Dushane et al. | |
| 6,213,404 B1 | | 4/2001 | Dushane et al. | |
| 6,315,211 B1 | | 11/2001 | Sartain et al. | |
| 6,371,059 B1 | | 4/2002 | Lemberger et al. | |
| 2002/0047050 A1 | | 4/2002 | Leu et al. | |
| 2003/0150923 A1 | | 8/2003 | Leu | |
| 2004/0026521 A1 | * | 2/2004 | Colas et al. | 236/34.5 |

* cited by examiner

THERMOSTAT APPARATUS FOR USE WITH TEMPERATURE CONTROL SYSTEM

BACKGROUND OF THE DISCLOSURE

The present disclosure relates to temperature control systems for controlling the temperature of a heated device.

Temperature control systems may comprise a thermostat to control flow of coolant between a heated device and a heat exchanger. The heated device may be, for example, an engine that heats up as it operates. The heat exchanger may be, for example, a radiator associated with the engine to cool liquid coolant that circulates through the engine for cooling the engine. The thermostat may be used to direct coolant from the engine back to the engine so as to bypass the radiator to warm up the engine when the engine is cold. When the engine reaches a desired operating temperature, the thermostat may allow coolant to begin to flow to the radiator to prevent engine overheating.

SUMMARY OF THE DISCLOSURE

The present invention comprises one or more of the following features or combinations thereof. A thermostat apparatus is provided to control the flow of coolant between a heated device and a heat exchanger to control the temperature of the heated device. The thermostat apparatus comprises a thermostat and a positioner for establishing different operating temperatures for the thermostat.

The thermostat may comprise a valve, a first piston, and a first thermal expansion device cooperatively associated to move the valve in response to temperature. In such a case, the first thermal expansion device comprises a temperature responsive first expansion agent (e.g., wax) to relatively move the first piston and the first thermal expansion device to move the valve away from a valve seat to allow flow of coolant from the heated device to the heat exchanger.

The positioner may comprise a second piston, a second thermal expansion device comprising a temperature responsive second expansion agent (e.g., wax), and a heater. The heater heats the second expansion agent to relatively move the second piston and second thermal expansion device which, in turn, relatively moves the first piston and first thermal expansion device between a higher valve actuation temperature position establishing a higher valve actuation temperature for actuating the valve and a lower valve actuation temperature position establishing a lower valve actuation temperature for actuating the valve.

The heater may be an electric heater (e.g, an electric positive thermal coefficient ceramic heater). A controller (e.g., an engine control module) may be electrically coupled to the electric heater via a relay switch either to supply electric power to the heater to "activate" the positioner or not to supply electric power to the heater to "de-activate" the positioner. When the positioner is activated, the heater heats the second expansion agent to extend the second piston from the second thermal expansion device. Upon extension, the second piston causes the first piston to retract into the first thermal expansion device a predetermined distance from the higher valve actuation temperature position to the lower valve actuation temperature position to establish the lower valve actuation temperature for actuating the valve. When the positioner is de-activated, the first piston and first thermal expansion device will actuate the valve at the higher valve actuation temperature.

A heat sink may be positioned in the second expansion agent to distribute heat from the heater into the second expansion agent. There may be two such heat sinks, one on each side of the heater. Each heat sink may have a plurality of tines extending in the second expansion agent.

The positioner may comprise a stroke limiter between the positioner piston and thermostat piston to limit the stroke of the thermostat piston to the predetermined distance. The stroke limiter comprises a spring and a spring housing around the spring. When the positioner piston strokes the predetermined distance, the spring housing engages a stroke-limiting surface to stop movement of the thermostat piston. Any excessive stroke of the positioner piston is then taken up by the spring so that the thermostat piston moves only the predetermined distance to achieve a corresponding change in valve actuation temperature.

The thermostat may be positioned in a coolant passageway so that the first expansion agent will react to the temperature of coolant in the coolant passageway. The positioner may be positioned outside the coolant passageway so that the second expansion agent will react to heat from the heater rather than the temperature of coolant in the coolant passageway to promote control of the positioner.

Additional features and advantages of the apparatus will become apparent to those skilled in the art upon consideration of the following detailed description exemplifying the best mode of the disclosure as presently perceived.

BRIEF DESCRIPTION OF THE DRAWINGS

The detailed description particularly refers to the accompanying figures in which.

DETAILED DESCRIPTION OF THE DRAWINGS

Figure 1:
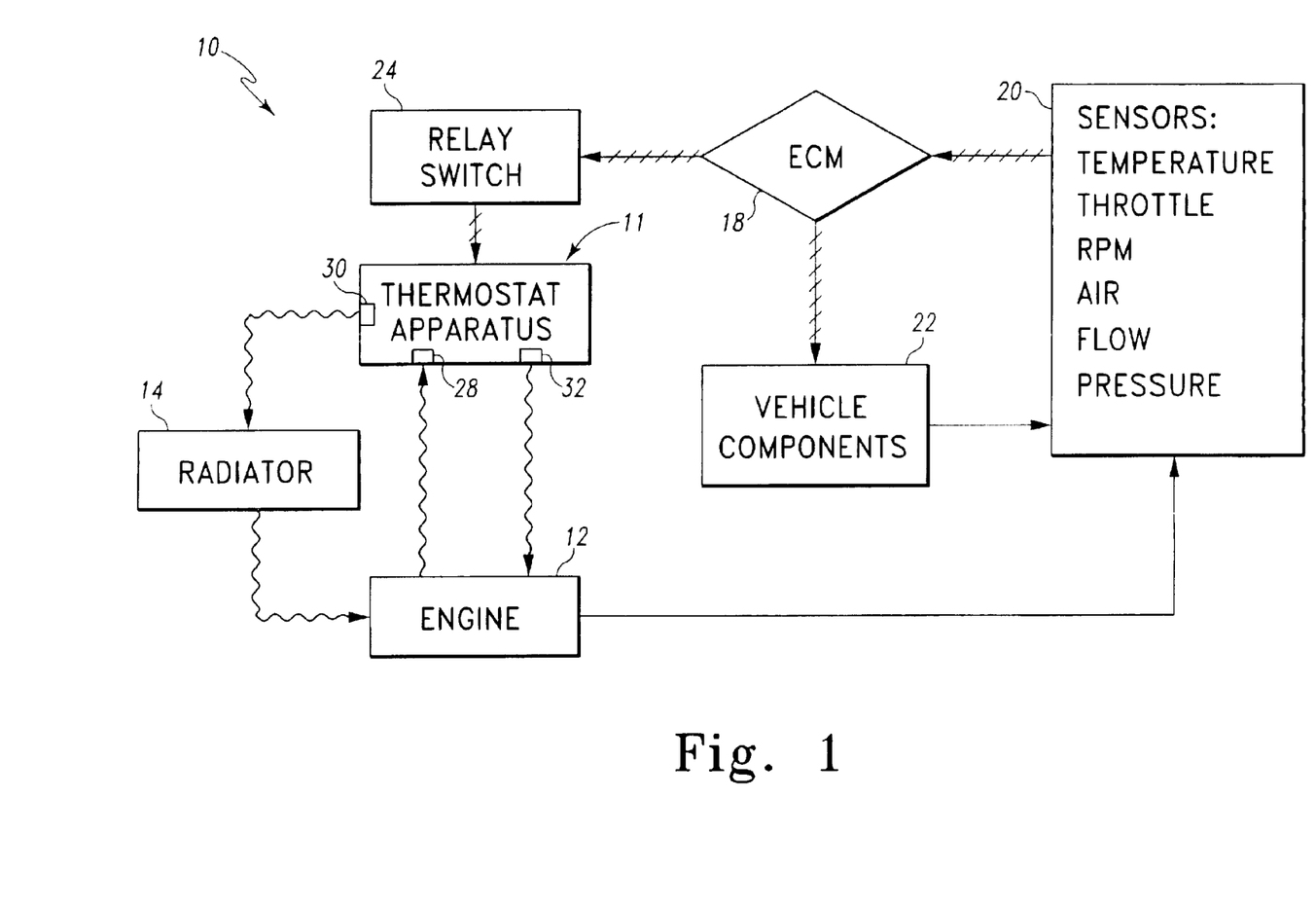
FIG. 1 is a simplified diagrammatic view of a temperature control system.
Figure 2:
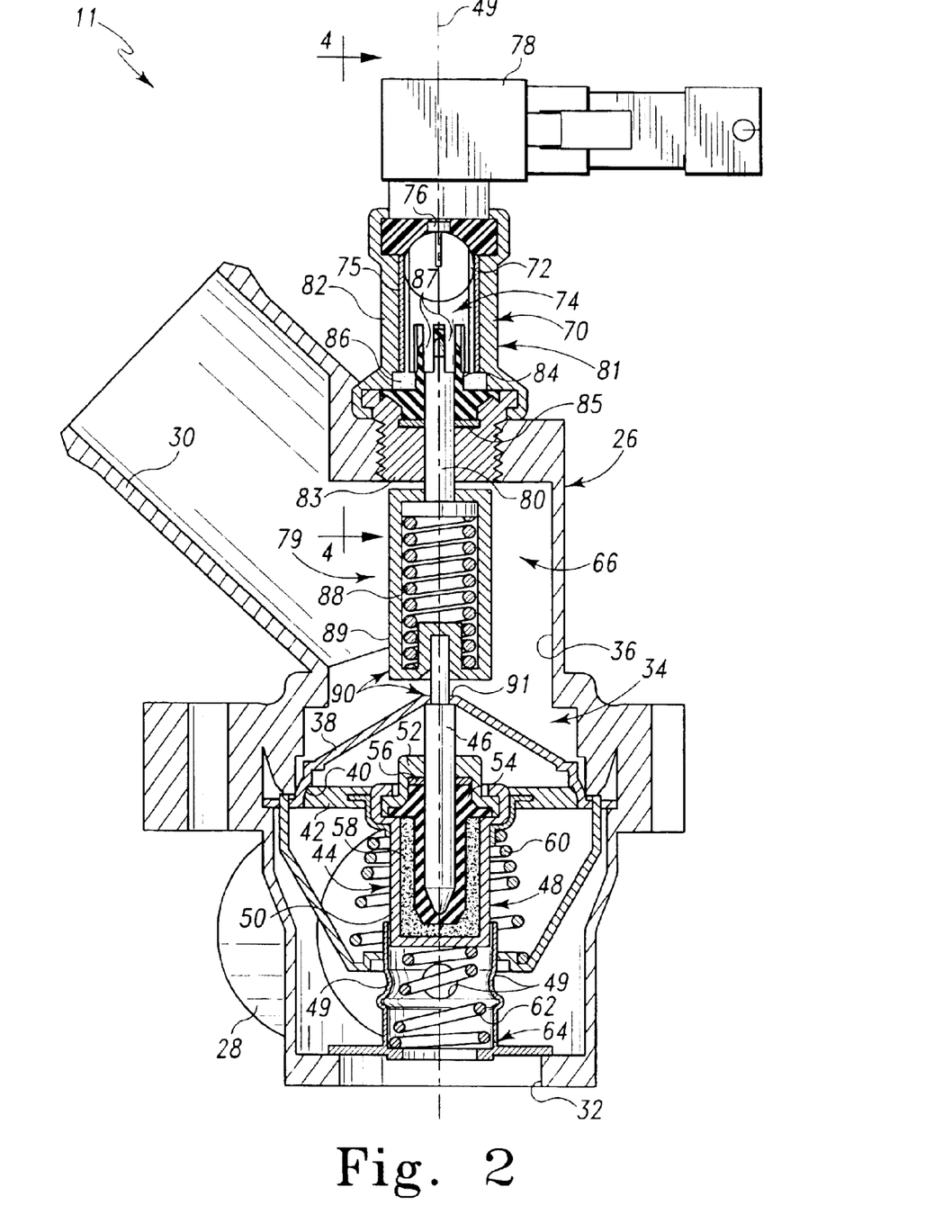
FIG. 2 is a sectional view of the thermostat apparatus of FIG. 1 showing the thermostat apparatus comprising a thermostat positioned in a higher valve actuation temperature position by a positioner (located above the thermostat) to establish a higher valve actuation temperature for actuating a valve of the thermostat.
Figure 3:
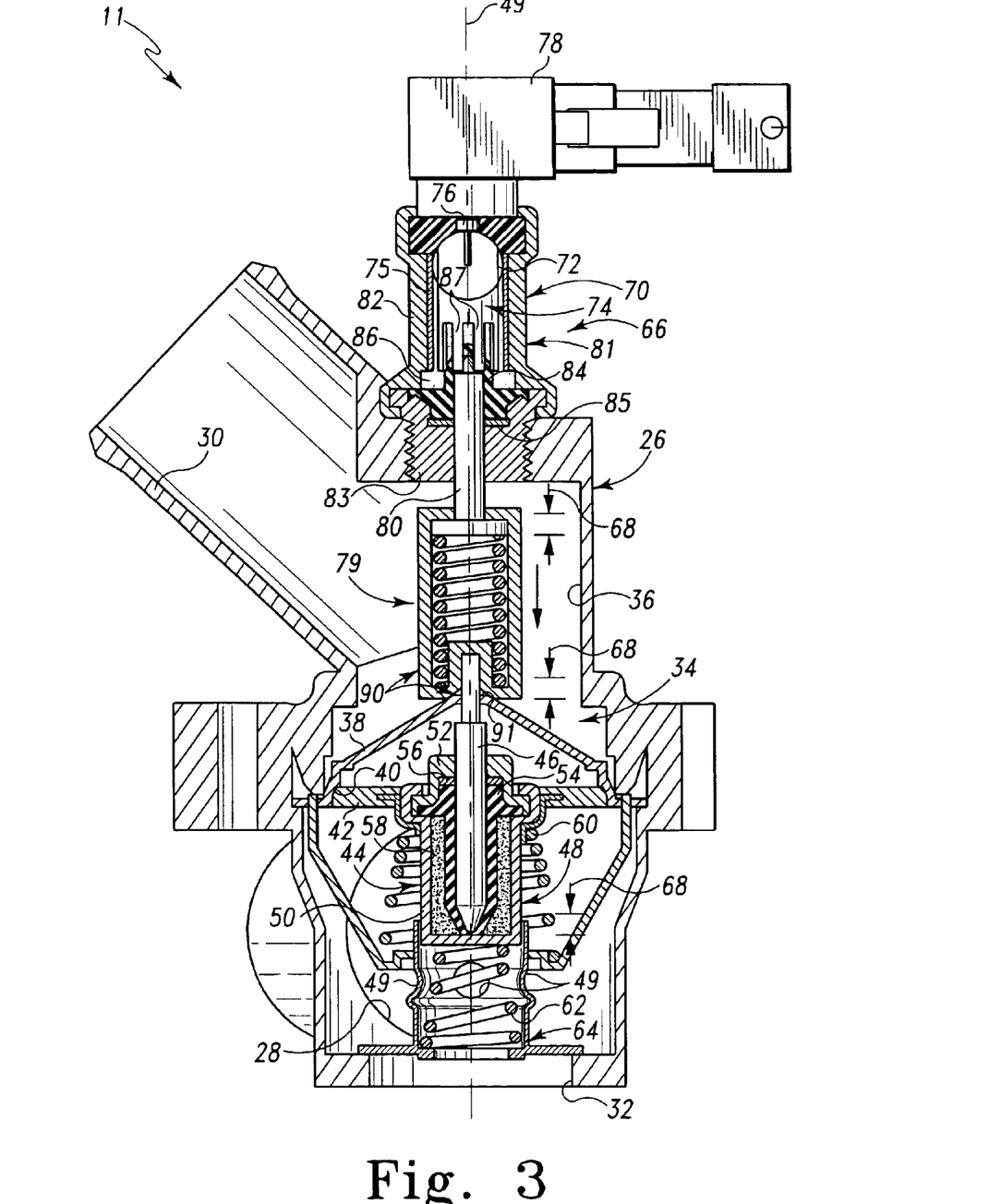
FIG. 3 is a sectional view similar to FIG. 2 showing the positioner positioning the thermostat in a lower valve actuation temperature position to establish a lower valve actuation temperature for actuating the valve.

A temperature control system 10 is illustrated in FIG. 1. The temperature control system 10 comprises a dual-mode thermostat apparatus 11 to control flow of coolant between a heated device, such as an engine 12, and a heat exchanger, such as a radiator 14, to control the temperature of the engine 12. The thermostat apparatus 11 is operable in two modes: a higher temperature mode, as illustrated in FIG. 2, and a lower temperature mode, as illustrated in FIG. 3. In the higher temperature mode, the thermostat apparatus 11 is configured so that the engine 12 will operate at a higher temperature to achieve, for example, higher fuel efficiency and faster engine and passenger compartment warn-up. In the lower temperature mode, the thermostat apparatus 11 is configured to achieve, for example, rapid cooling of the engine 12 so that the engine 12 will operate at a lower temperature which may be desirable when the engine 12 is operated under high load conditions (e.g., going up a hill) or in high ambient temperature conditions.

An engine control module (ECM) 18 illustrated diagrammatically in FIG. 1 determines the optimum operating temperature for the engine 12 and controls which mode the thermostat apparatus 11 is to operate to achieve the optimum engine operating temperature. To do so, the ECM 18 receives electric signals from a variety of sensors 20 associated with the engine 12 and other vehicle components 22 (e.g., fuel, air, exhaust, electrical, and mechanical systems) to detect, for example, manifold temperature, throttle position, engine rpm, mass air input to the engine 12, ESC knock, exhaust output, flow conditions, pressures, to name a few. The ECM 18 uses this information to control the vehicle components 22 and the thermostat apparatus 11 for engine performance optimization.

The ECM 18 controls the mode of operation of the thermostat apparatus 11 via a relay switch 24. When rapid cooling is required, the ECM 18 sends a power-on signal to the relay switch 24 to supply electric power to the thermostat apparatus 11 so that the thermostat apparatus 11 will operate in the lower temperature mode. When rapid cooling is no longer required, the ECM 18 sends a power-off signal to the relay switch 24 to disconnect electric power from the thermostat apparatus 11 so that the thermostat apparatus 11 will operate in the higher temperature mode. The components of the thermostat apparatus 11 are now discussed.

The thermostat apparatus 11 comprises a housing 26, as illustrated in FIGS. 2 and 3. The housing 26 comprises a coolant inlet 28 to admit coolant from the engine 12 into the housing 26, a first coolant outlet 30 to discharge coolant to the radiator 14, and a second coolant outlet 32 to discharge coolant back to the engine 12 to bypass the radiator 14.

Figure 5:
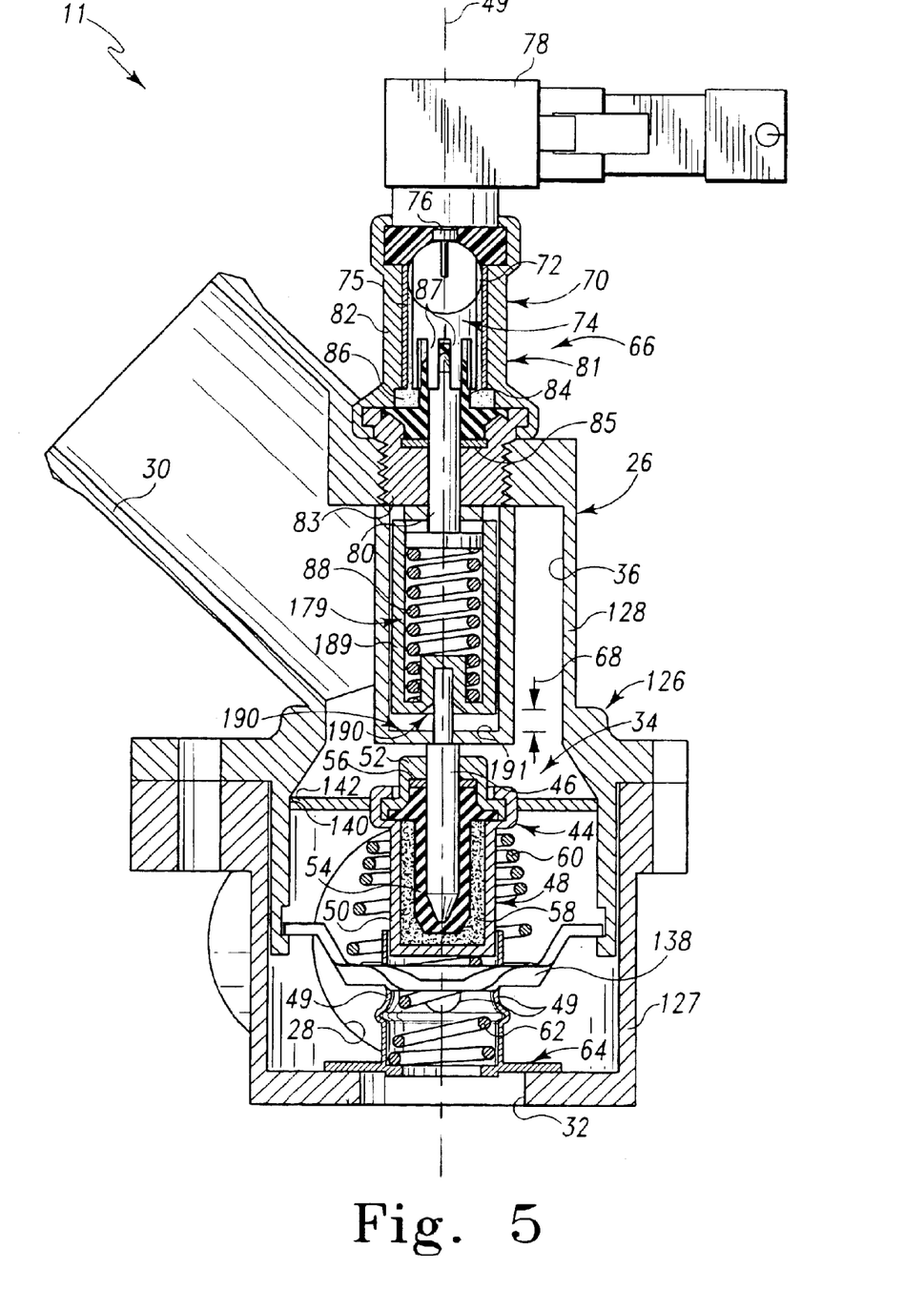
FIG. 5 is a sectional view showing another embodiment of the thermostat apparatus.

An alterative housing 126 for use in the thermostat apparatus 11 is illustrated in FIG. 5. The housing 126 comprises two portions 127, 128 coupled together. The axially inner portion 127 comprises the coolant inlet 28 and the second coolant outlet 32. The axially outer portion 128 comprises the first coolant outlet 30.

The thermostat apparatus 11 comprises a thermostat 34 positioned in a coolant passageway 36 of the housing 26, as illustrated in FIGS. 2 and 3. A frame 38 of the thermostat 34 is secured to the housing 26 in recessed portions thereof so that the frame 38 is stationary relative to the housing 26. The frame 38 comprises a valve seat 40 for a valve 42 of the thermostat 34. When using the alternative housing 126, the frame 38 and valve 42 may be configured as the frame 138 and valve 142 illustrated in FIG. 5 wherein the frame 138 is secured to the second portion 128 which provides a valve seat 140 for the valve 142. It is within the scope of this disclosure for either valve 42, 142 to include a service fill vent valve (not illustrated), which is also known as a jiggle pin vent valve, to control venting through the valve 42, 142.

The thermostat 34 further comprises a temperature responsive wax motor 44, as illustrated in FIGS. 2 and 3. The wax motor 44 comprises a piston 46 and a thermal expansion device 48. The piston 46 and the thermal expansion device 48 are relatively movable in response to a valve actuation temperature to move the valve 42 axially inwardly relative to an axis 49 away from the valve seat 40.

The thermal expansion device 48 comprises a cup 50, a cover 52, a piston sleeve 54, a seal 56, and temperature responsive first expansion agent 58, as illustrated in FIGS. 2 and 3. The cover 52 closes an end opening of the cup 50. The piston sleeve 54 receives the piston 46 for relative movement therebetween and is made of, for example, a fluoroelastomer such as VITON®. The seal 56 prevents excursion of the piston sleeve 54 out of the cup 50 upon relative movement between the piston 46 and the piston sleeve 54 and is made of, for example, RULON®. The first expansion agent 58 comprises wax and filler material such as copper and/or graphite to increase the temperature responsiveness of the agent 58.

Normally, the piston 46 and thermal expansion device 48 are positioned to seat the valve 42 against the valve seat 40. As such, all coolant flow is from the coolant inlet 28 through a bypass valve 64 to the second coolant outlet 32 to bypass the radiator 14 and flow back to the engine 12.

The valve 42 is moved away from the valve seat 40 in response to relative movement between the piston 46 and the thermal expansion device 48. Such relative movement is caused by expansion of the wax of the agent 58. The wax melts and expands when it is heated to the valve actuation temperature. As the wax expands, it, along with its filler material, fills an internal volume in the device 48 so as to squeeze the piston sleeve 54 against the piston 46. This squeezing action by the piston sleeve 54 causes the thermal expansion device 48 to move axially inwardly when the piston 46 is blocked against axially outward movement, as discussed in more detail below. Axially inward movement of the thermal expansion device 48 moves the valve 42 axially inwardly away from the valve seat 40 to allow coolant to begin to flow from the coolant inlet 28 to the first coolant outlet 30 so that coolant begins to flow to the radiator 14. Further axially inward movement of the device 48 causes the cup to occlude bypass valve inlets 49 in the bypass valve 64 to shut off bypass flow through the bypass valve 64 so that all coolant flow is to the radiator 14. When the coolant temperature lowers, a thermostat spring 60 and bypass spring 62 return the device 48 and valve 42 back to their initial position.

Onset of axially inward movement of the thermal expansion device 48 is dependent on the amount of volume that the agent 58 must occupy by expansion before it will cause axially inward movement of the device 48. A larger volume means that the agent 58 must expand more before causing onset of axially inward movement of the device 48. As such, axially inward movement of the device 48 will occur later and at a higher temperature. A smaller volume means that the agent 58 must expand less before causing onset of axially inward movement of the device 48. As such, onset of axially inward movement of the device 48 will occur earlier and at a lower temperature.

The thermostat apparatus II comprises a positioner 66 aligned coaxially with the thermostat 34, as illustrated in FIGS. 2 and 3, to move the piston 46 into the device 48 to change the volume that the agent 58 must occupy by expansion before it will cause axially inward movement of the device 48, as illustrated in FIGS. 2 and 3. In doing so, the positioner 66 moves the piston 46 relative to the device 48 from a higher valve actuation temperature position, as illustrated in FIG. 2, to a lower valve actuation temperature position, as illustrated in FIG. 3. In the higher valve actuation temperature position, the expansion agent 58 must fill a greater volume before moving the device 48 axially inwardly. As such, the higher valve actuation temperature position establishes a higher valve actuation temperature (e.g., 205° F.) for actuating the valve 42 and thus establishes the thermostat apparatus 11 in its higher temperature mode. In the lower valve actuation temperature position, the expansion agent 58 must fill a smaller volume before moving the device 48 axially inwardly. As such, the lower valve actuation temperature position establishes a lower valve actuation temperature (e.g., 195° F.) for actuating the valve 42 and thus establishes the thermostat apparatus 11 in its lower temperature mode.

The positioner 66 pushes the piston 46 into the piston sleeve 54 a distance 68, as suggested in FIG. 3, when it moves the piston 46 from the higher valve actuation temperature position to the lower valve actuation temperature position. The distance 68 is, for example, about 0.1 inch to achieve about a 10° F. drop in valve actuation temperature.

The positioner 66 moves the piston 46 axially inwardly from the higher valve actuation temperature position to the lower valve actuation temperature position when the positioner 66 is "activated" by the ECM 18. It allows the agent 58 to push the piston 46 axially outwardly back to the higher valve actuation temperature position when the positioner 66 is "de-activated" by the ECM 18. What is meant by "activated" and "de-activated" will become more clear with the following discussion of the components of the positioner 66.

Figure 4:
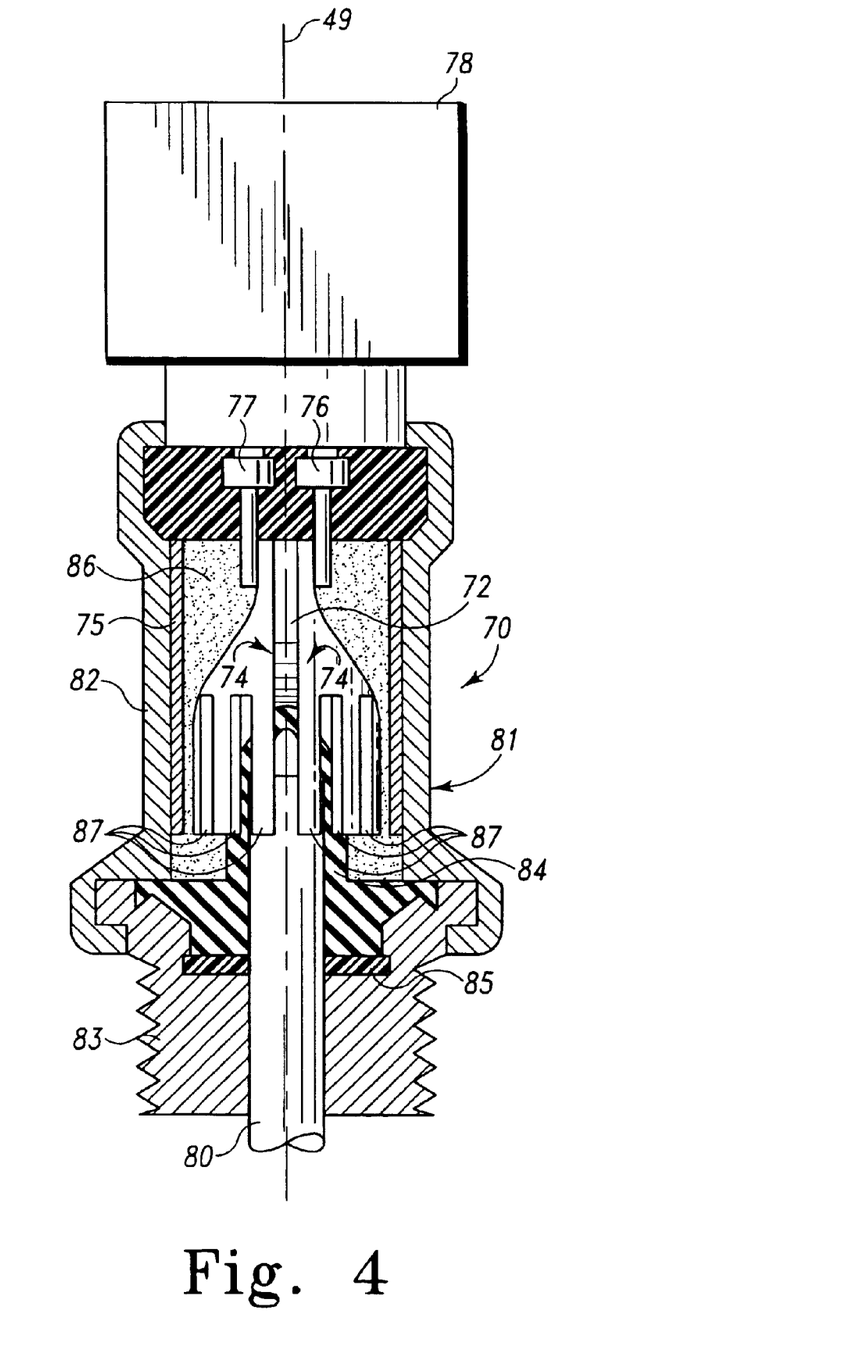
FIG. 4 is a sectional view taken along lines 4—4 of FIG. 2.

The positioner 66 comprises a wax motor 70, an electric heater 72, a pair of heat sinks 74, an electric and thermal sleeve insulator 75, live and ground electric leads 76, 77, an electrical connector 78, and a spring unit 79, as illustrated in one or more of FIGS. 2–4.

The wax motor 70 comprises a piston 80 (which may be referred to as an output member) and a thermal expansion device 81, as illustrated in FIGS. 2–4. The piston 80 and thermal expansion device 81 are relatively movable in response to heat generated by the heater 72.

The thermal expansion device 81 comprises a cup 82, a threaded cover 83, a piston sleeve 84, a seal 85, and temperature responsive second expansion agent 86, as illustrated best in FIG. 4. The threaded cover 83 closes an end opening of the cup 82 and is threaded to the housing 26. The piston sleeve 84 receives the piston 80 for relative movement therebetween and is made of, for example, a fluroelastomer such as VITON®. The seal 85 prevents excursion of the piston sleeve 84 out of the cup 82 upon relative movement between the piston 80 and the piston sleeve 84 and is made of, for example, RULON®. The second expansion agent 86 is made of wax material known as "white wax."

The positioner 66 is "activated" when the ECM 18 sends the power-on signal to the relay switch 24 to supply electric power to the heater 72. Electric power is supplied to the heater 72 via the connector 78 and the leads 76, 77. Each lead 76, 77 contacts one of the heat sinks 74. In turn, each heat sink 74 contacts one side of the heater 72 to establish an electric current through the heater 72. Conversely, the positioner 66 is "de-activated" when the ECM 18 sends the power-off signal to the relay switch 24 to disconnect electric power from the heater 72.

To provide heat to the agent 86, the heater 72 is embedded in the agent 86, as illustrated best in FIG. 4. The heater 72 is, for example, a self-regulating positive thermal coefficient ceramic heater. Illustratively, the heater 72 is shaped like a disk which appears to be "standing on edge" in FIG. 4.

To promote distribution of heat from the heater 72 to the agent 86, the heat sinks 74 are also embedded in the agent 86, as illustrated best in FIG. 4. The heat sinks 74 are positioned on either side of the heater 72 in electrical and thermal contact therewith and in spaced-apart relation from one another. Each heat sink 74 comprises a plurality of axially extending tines 87 arranged in a half-cylinder pattern. The tines 87 are embedded in the agent 86 to distribute heat from the heater 72 to the agent 86 to promote responsiveness of the wax motor 70.

As the wax agent 86 is heated, it melts and expands, as illustrated in FIG. 3. Expansion of the agent 86 applies axial and radial forces to the piston sleeve 84 to cause the piston 80 to move axially inwardly. The piston 80 moves axially inwardly the distance 68 from an axially outward position illustrated in FIG. 2 to an axially inward position illustrated in FIG. 3.

Axially inward motion of the positioner piston 80 from the axially outward position to the axially inward position is transmitted to the thermostat piston 46 of the thermostat 34 via the spring unit 79. Such motion is transmitted to the thermostat piston 46 for movement thereof farther into thermostat piston sleeve 54 from the higher valve actuation temperature position, illustrated in FIG. 2, to the lower valve actuation temperature position, illustrated in FIG. 3, to establish the lower valve actuation temperature.

The spring unit 79 comprises a spring 88 and a spring housing 89 that contains the spring 88, as illustrated in FIGS. 2 and 3. The piston 80 extends into the housing 89 through an axially outer aperture formed therein to contact the spring 88. An axially inner end of the housing 89 comprises a piston aligning recessed portion that receives and aligns the thermostat piston 46 with the positioner piston 80 on the axis 49. Axially inward motion of the positioner piston 80 is thus transmitted to the thermostat piston 46 via the spring 88 and the housing 89.

The axially inner end of the spring housing 89 contacts a stroke-limiting surface 91 on the frame 38 when the positioner piston 80 strokes the predetermined distance 68 (e.g., 0.1 inch) to establish the predetermined decrease (e.g., 10° F.) in valve actuation temperature. Any excessive motion of the positioner piston 80 beyond the predetermined distance 68 is taken up by the spring 88 so that the stroke of the thermostat piston 46 is limited to the predetermined distance 68. The spring unit 89 and the stroke-limiting surface 91 may thus be referred to as a piston stroke limiter 90 for limiting retraction of the thermostat piston 46 into the thermostat thermal expansion device 48 due to extension of the positioner piston 80 from the positioner thermal expansion device 81.

An alternative stroke limiter 190 is illustrated in FIG. 5. The alternative stroke limiter comprises a spring unit 179 and a stroke-limiting surface 191 on the axially outer housing portion 128. The spring unit 179 comprises the spring 88 and a spring housing 189 surrounding the spring 88. The spring housing 189 has an axially outer open end receiving the positioner piston 80 for engagement with the spring 88. An axially inner, piston aligning recessed portion of the housing 189 receives the thermostat piston 46. The axially inner end of the housing 189 contacts the stroke-limiting surface 191 when the piston positioner 80 strokes the predetermined distance 68 (e.g., 0.1 inch) to establish the predetermined decrease (e.g., 10° F.) in valve actuation temperature. Any excessive motion of the positioner piston 80 beyond the predetermined distance 68 is taken up by the spring 88.

The thermostat piston 46 is allowed to return to the higher valve actuation temperature position when the positioner 66 is de-activated. When the positioner 66 is de-activated, the positioner wax 86 re-solidifies allowing the positioner piston 80 to retract back into the positioner piston sleeve 84 in response to axially outward movement of the thermostat piston 46. Such axially outward movement of the thermostat piston 46 occurs when the thermostat expansion agent 58 begins to expand because, at first, the positioner piston 80 does not block the axially outward movement of the thermostat piston 46.

Eventually, the positioner piston sleeve 84 stops retraction of the positioner piston 80. When this occurs, the thermostat piston 46 stops moving axially outwardly. At this point, the thermostat piston 46 and the thermostat thermal expansion device 48 are in their higher valve actuation temperature position. Because the thermostat piston 46 stops moving axially outwardly, the thermostat device 48 starts moving axially inwardly, thereby causing the valve 42 to move apart from its valve seat 40. Such valve unseating occurs at the higher valve actuation temperature. As such, the higher valve actuation temperature is established by the higher valve actuation temperature position of the piston 46 and device 48.

The thermal expansion device 81, the heater 72, and the heat sinks 74 are positioned outside the coolant passageway 36 rather than inside the coolant passageway. On the other hand, the thermostat 34 is positioned in the coolant passageway 36. These factors promote more precise control of the positioner 66, the thermostat 34, and thus engine temperature.

It is within the scope of this disclosure for the thermostat 34 to be "reversed" in that the positioner 66 is used to move the device 48 between the higher and lower valve actuation temperature positions rather than the piston 46.

It is within the scope of this disclosure to use other types of positioners. For example, the positioner may comprise a driver and a lead screw coupled to the driver and one of the thermostat piston 46 and device 48 for relative movement between higher and lower valve actuation temperature positions. The driver may comprise an electric motor such as a stepper motor. The positioner may comprise a solenoid coupled to one of the piston 46 and device 48 for relative movement between higher and lower valve actuation temperature positions. The positioner may comprise a lever coupled to one of the piston 46 and device 48 for relative movement between higher and lower valve actuation temperature positions. The positioner may comprise bellows coupled to one of the piston 46 and device 48 for relative movement between higher and lower valve actuation temperature positions.

Although certain illustrative embodiments have been disclosed in detail, variations and modifications exist within the scope and spirit of the invention as described and defined in the following claims.

What is claimed is:

1. A thermostat apparatus comprising a thermostat and a positioner for establishing the actuation temperature for the thermostat, the thermostat comprising a wax motor comprising a piston, and the positioner comprising an output member having at least two positions, each representing a predetermined actuation temperature for the thermostat and a piston stroke limiter to limit motion of the piston upon motion of the output member beyond one of its two positions to establish one of the predetermined actuation temperatures.

2. The thermostat apparatus of claim 1, wherein the thermostat comprises a valve, and the positioner comprises an expansion agent and a heater to heat the expansion agent to move the output member between its two positions to move the piston between a higher valve actuation temperature position establishing a higher valve actuation temperature for actuating the valve and a lower valve actuation temperature position establishing a lower valve actuation temperature for actuating the valve.

3. The thermostat apparatus of claim 2, wherein the heater is an electric heater.

4. The thermostat apparatus of claim 3, wherein the output member is moved from a first of its two positions to a second of its two positions to move the piston from the higher valve actuation temperature position to the lower valve actuation temperature position when electric power is supplied to the heater.

5. The thermostat apparatus of claim 2, wherein the positioner comprises a heat sink to distribute heat from the heater to the expansion agent.

6. The thermostat apparatus of claim 2, wherein the piston stroke limiter comprises a spring, a stroke-limiting surface, and a spring housing containing the spring and movable into engagement with the stroke-limiting surface to limit motion of the first piston upon loading of the spring due to motion of the output member.

7. A thermostat apparatus comprising
a thermostat comprising a valve, first piston, and first thermal expansion device cooperatively associated to actuate the valve in response to a valve actuation temperature, and
a positioner to relatively move the first piston and first thermal expansion device between a higher valve actuation temperature position establishing a higher valve actuation temperature for actuating the valve and a lower valve actuation temperature position establishing a lower valve actuation temperature for actuating the valve, the positioner comprising a second thermal expansion device and a second piston extensible from the second thermal expansion device in response to temperature and operatively connected to the first piston.

8. The thermostat apparatus of claim 7, wherein the positioner comprises (i) a second thermal expansion device comprising an expansion agent responsive to temperature and (ii) a heater to heat the expansion agent to relatively move the second piston and the second thermal expansion device to relatively move the first piston and the first thermal expansion device between the higher and lower valve actuation temperature positions.

9. The thermostat apparatus of claim 8, wherein the heater is an electric heater.

10. The thermostat apparatus of claim 8, wherein the positioner comprises a heat sink to distribute heat from the heater to the expansion agent.

11. The thermostat apparatus of claim 8, wherein the positioner comprises a spring between the first piston and the second piston.

12. The thermostat apparatus of claim 7, wherein the positioner comprises a piston stroke limiter to take up excess extension of the second piston from the second thermal expansion device to limit retraction of the first piston into the first thermal expansion device.

13. The thermostat apparatus of claim 12, wherein the piston stroke limiter comprises a spring, a stroke-limiting surface, and a spring housing containing the spring and movable into engagement with the stroke-limiting surface to limit retraction of the first piston upon loading of the spring due to extension of the second piston.

14. A thermostat apparatus comprising
a thermostat comprising a valve, a first piston, and a first thermal expansion device receiving the first piston and comprising a first expansion agent responsive to a valve actuation temperature to relatively move the first piston and the first thermal expansion device to actuate the valve, and
a positioner comprising a second piston, a second thermal expansion device receiving the second piston and comprising a second expansion agent responsive to temperature, and a heater to heat the second expansion agent to extend the second piston from the second thermal expansion device to retract the first piston into the first thermal expansion device from a higher valve actuation temperature position establishing a higher valve actuation temperature for actuating the valve to a lower valve actuation temperature position establishing a lower valve actuation temperature for actuating the valve.

15. The thermostat apparatus of claim 14, wherein each of the first and second expansion agents comprises wax.

16. The thermostat apparatus of claim 14, wherein the heater is an electric heater.

17. The thermostat apparatus of claim 14, wherein the positioner comprises a heat sink to distribute heat from the heater to the second expansion agent.

18. The thermostat apparatus of claim 14, wherein the positioner comprises a first and second heat sinks to distribute heat from the heater to the second expansion agent, each heat sink comprises a plurality of tines embedded in the second expansion agent, and the heater is an electric positive thermal coefficient ceramic heater embedded in the second expansion agent and positioned between and in contact with the heat sinks.

19. The thermostat apparatus of claim 14, wherein the positioner comprises a piston stroke limiter to limit retraction of the first piston into the first thermal expansion device due to extension of the second piston from the second thermal expansion device.

20. The thermostat apparatus of claim 14, comprising a coolant flow passageway to conduct a flow of coolant, wherein the thermostat is positioned in the coolant passageway, and the second expansion agent is positioned outside the coolant passageway.

* * * * *